United States Patent
Nakahara et al.

[11] Patent Number: 6,048,470
[45] Date of Patent: Apr. 11, 2000

[54] ALUMINA SOL, ALUMINA HYDRATE POWDER AND PROCESSES FOR THEIR PRODUCTION

[75] Inventors: Katsumasa Nakahara; Kenji Yamada; Hachiro Hirano, all of Ichihara; Toshiya Matsubara, Yokohama, all of Japan

[73] Assignee: Asahi Glass Company Ltd., Tokyo, Japan

[21] Appl. No.: 08/992,906

[22] Filed: Dec. 18, 1997

[30] Foreign Application Priority Data

Dec. 20, 1996 [JP] Japan ................................... 8-341964
Dec. 26, 1996 [JP] Japan ................................... 8-348611

[51] Int. Cl.⁷ ............................................. B32B 5/16
[52] U.S. Cl. ........................ 252/313.1; 252/315.7; 252/351; 428/403
[58] Field of Search ................ 438/403; 252/313.1, 252/315.7, 351

[56] References Cited

U.S. PATENT DOCUMENTS

| | | | |
|---|---|---|---|
| 4,211,667 | 7/1980 | Yamada et al. | 252/313 R |
| 4,244,835 | 1/1981 | Block | 252/313 R |
| 4,512,913 | 4/1985 | Ritter, II | 252/313.1 |
| 4,714,567 | 12/1987 | Roha | 252/315.2 |
| 4,801,399 | 1/1989 | Clark et al. | 252/315.01 |
| 4,981,819 | 1/1991 | Rinn | 501/12 |
| 5,552,035 | 9/1996 | Potter et al. | 208/135 |
| 5,591,380 | 1/1997 | Wright | 252/313.1 |
| 5,681,658 | 10/1997 | Anderson et al. | 428/403 |
| 5,731,261 | 3/1998 | Balducci et al. | 502/439 |
| 5,756,001 | 5/1998 | Mori et al. | 252/313.1 |

FOREIGN PATENT DOCUMENTS

| | | |
|---|---|---|
| 0 701 904 | 3/1996 | European Pat. Off. . |
| 0 736 491 | 10/1996 | European Pat. Off. . |
| 0 739 857 | 10/1996 | European Pat. Off. . |

OTHER PUBLICATIONS

Chemical Abstract, vol. 126, No. 9, Mar. 3, 1997, AN 119665, JP 8–325010, 1996.

Patent Abstract of Japan, vol. 8, No. 24, Feb. 2, 1984, JP 58–190823, Nov. 7, 1983.

*Primary Examiner*—Hoa T. Le
*Attorney, Agent, or Firm*—Oblon, Spivak, McClelland, Maier & Neustadt, P.C.

[57] ABSTRACT

A process for producing an alumina sol, which comprises stirring a dispersion of an alumina hydrate having a solid content of from 1 to 40 wt % at a pH of from 7 to 12 with an effective consumptive power of at least 0.5 kW/m³ for aggregation treatment, and then adding an acid thereto for peptization treatment.

11 Claims, No Drawings

ALUMINA SOL, ALUMINA HYDRATE POWDER AND PROCESSES FOR THEIR PRODUCTION

The present invention relates to an alumina sol and an alumina hydrate powder, and processes for their production.

A recording medium has been known which has an ink-receiving layer containing pseudoboehmite formed on a substrate (JP-A-2-276670, JP-A-4-37576). Such an ink-receiving layer is a porous layer formed by coating an alumina sol on a substrate, followed by gelation. In order for such a recording medium to attain recording of high quality, it is required that the ink-receiving layer has high transparency, and the pore size and the pore volume of the ink-receiving layer, are large.

In order -to increase the color density of ink after printing, the amount of the printing ink is increased. However, if the pore size and the pore volume in the ink-receiving layer are not sufficiently large, it takes time for ink absorption, and a problem of beading or running of ink is likely to result, and further, the circularity of printed dots tends to be poor, whereby it tends to be difficult to attain recording of high quality.

If the transparency of the ink-receiving layer is low, even if a transparent substrate is used, it will be impossible to obtain a recording medium having a good transparency, which is useful as a film for an overhead projector (hereinafter referred to simply as OHP). When an opaque substrate is employed, low transparency of the ink-receiving layer result in low reflective color density of the ink after printing, and it will be difficult to attain recording of high quality.

As a method for producing an alumina sol, a method is known wherein aluminum isopropoxide is hydrolyzed, and then, an acid is added for peptization (B. E. Yoldas, *Amer. Ceram. Soc. Bull.*, 54, 289 (1975)). The alumina sol obtained by this method is a transparent sol and can be used for various applications.

Further, a method is known wherein an alkali metal hydroxide is added to an alkali metal aluminate, if necessary, and an acid or an acid salt such as aluminum chloride, sulfate or nitrate, is mixed, or an alkali metal aluminate or an acid salt of an aluminum is ion-exchanged by an ion exchange resin to obtain an alumina hydrate precipitation, which is aged and then peptized to obtain an alumina sol.

Further, a method is also known wherein an alumina precipitation obtained by hydrolysis of aluminum dodexide, is aged to form a sol (JP-A-7-232473).

However, the xerogels obtained by drying alumina sols obtained by the above three methods were inadequate in their ink absorptivity, as their average pore radii or pore volumes were small.

As a method for producing an alumina having a large pore volume, a method of calcining an alumina sol obtained by continuously adding an aluminum salt and a pH controlling agent to a slurry of aluminum hydroxide to maintain the pH at a level of from 6 to 11 (JP-A-58-190823), or a method of calcining an alumina gel obtained by repeating a plurality of times an operation of adding an aluminum-containing neutralizing agent to a slurry of aluminum hydroxide to adjust the pH at a level of from 6 to 11 (JP-A-58-213632), has been known. However, in either method, the product was anhydrous alumina particles calcined at 500° C., and an ink-receiving layer formed by such alumina particles, was poor in transparency.

A method is also known wherein an alumina precipitation obtained by neutralization or ion exchange of an aluminum salt or an alkali metal aluminate, is dried and pulverized to obtain a xerogel having a large pore volume, which is then mixed with a suitable binder to form an ink-receiving layer (JP-B-3-24906). However, with such a xerogel, the secondary particle size of the alumina hydrate was large, whereby there was a drawback that when formed into an ink-receiving layer, the transparency was poor.

Namely, no alumina hydrate powder has heretofore been obtained which has large pore size and pore volume and which has high transparency.

The present invention provides a process for producing an alumina sol, which comprises stirring a dispersion of an alumina hydrate having a solid content of from 1 to 40 wt % at a pH of from 7 to 12 with an effective consumptive power of at least 0.5 kW/m$^3$ for aggregation treatment, and then adding an acid thereto for peptization treatment.

Further, the present invention provides a process for producing an alumina hydrate powder, which comprises stirring a dispersion of an alumina hydrate having a solid content of from 1 to 40 wt % at a pH of from 7 to 12 with an effective consumptive power of at least 0.5 kW/m$^3$ for aggregation treatment, followed by drying.

The present invention also provides an alumina sol, which comprises an alumina hydrate as sol particles and an acid-containing water as a medium, and which is characterized in that an alumina hydrate powder obtainable by removing water from the alumina sol, has an average pore radius of at least 7 nm and a total volume of pores having pore radii of from 1 to 100 nm of from 0.80 to 2.00 cc/g, and the transmittance of a light having a wavelength of 530 nm through the alumina sol having a sol concentration of 0.5 wt %, is from 5 to 70%.

Still further, the present invention provides an alumina hydrate powder consisting essentially of an acid-containing alumina hydrate, which has an average pore radius of at least 7 nm and a total volume of pores having pore radii of from 1 to 100 nm of from 0.80 to 2.00 cc/g, and which is characterized in that the transmittance of a light having a wavelength of 530 nm through a sol having a sol concentration of 0.5 wt % obtained by dispersing the alumina hydrate powder in water, is from 5 to 70%.

In the present invention, the alumina hydrate powder means a xerogel of an alumina hydrate. The average pore radius and the pore volume are values measured by means of a nitrogen absorption-desorption apparatus, for an alumina sol, with respect to a xerogel obtained by drying the alumina sol at 140° C. to a constant weight, and for an alumina hydrate powder, with respect to one vacuum-deaerated as it is under 1×10$^{-2}$ Torr at 120° C. for two hours.

Further, in the present invention, the light transmittance of an alumina sol is a numerical value obtained by measuring the transmittance of a light having a wavelength of 530 nm through an alumina sol in a thickness of 10 mm having the concentration adjusted so that the sol concentration becomes 0.5 wt % (hereinafter referred to as the light transmittance at 0.5 wt %) by a spectral photometer. Here, the sol concentration is a solid content obtained by calculation based on the weight of a xerogel obtained by drying an alumina sol at 140° C. to a constant weight.

Now, the present invention will be described in detail with reference to the preferred embodiments.

In the present invention, it is important to carry out the aggregation treatment which consists of stirring a dispersion of an alumina hydrate having a solid content of from 1 to 40 wt % at a pH of from 7 to 12 intensively with an effective consumptive power of at least 0.5 kW/m$^3$. It is heretofore known to carry out aging at a pH of from 7 to 12 in the production of an alumina hydrate. As a result of an extensive research, the present inventors have found that when intensive stirring is carried out during the aging, crystal growth and aggregation of alumina hydrate particles take place efficiently, whereby the pore size and the pore volume remarkably increase.

In the present invention, the effective consumptive power for stirring means a consumptive power obtained by subtracting the consumptive power during a no load running from the total consumptive power for stirring. In the present invention, as such an effective consumptive power, intensive stirring is carried out with a power of at least $0.5$ kW/m$^3$ per unit volume of the dispersion of the alumina hydrate. If the power is less than $0.5$ kW/m$^3$, the crystal growth and aggregation of the alumina hydrate particles do not adequately proceed, and the pore size and pore volume do not become sufficiently large, such being undesirable. More preferably, the effective consumptive power is at least $1.5$ kW/m$^3$. The larger the effective consumptive power for stirring, the better, since the crystal growth and aggregation adequately proceed in a shorter period of time, and it is possible to obtain an alumina sol capable of forming an alumina xerogel having a large pore size and pore volume and to obtain an alumina hydrate powder having a large pore size and pore volume, such being very advantageous for industrial production. However, if stirring is excessively intense, vibration of the apparatus tends to be vigorous, whereby the operation tends to be difficult. Accordingly, stirring is preferably carried out with an effective consumptive power of at most $10$ kW/m$^3$.

In order to exert such a intensive stirring force to such a dispersion, the structure of stirring vanes is preferably in the form of multi-stage paddle vanes, multi-stage turbine vanes or anchor vanes, and such intensive stirring can be realized by rotating stirring vanes of such types at a high speed. Faudler vanes or the like may also be used. Further, it is also effective to provide baffle plates.

The pH in the aggregation treatment is form 7 to 12. If the pH is less than 7, crystal growth and aggregation of the alumina hydrate particles will not adequately proceed, and the pore size and pore volume will not be sufficiently large. If the pH exceeds 12, the alumina hydrate tends to dissolve. The pH is more preferably from 8 to 11.

It is preferred to add an alkali to adjust the pH of the alumina hydrate dispersion to the above range. The alkali to be added, is not particularly limited, and an alkali metal hydroxide, an alkaline earth metal hydroxide, ammonia, an amine or a quarternary ammonium hydroxide may, for example, be used. Further, an alkali containing aluminum, such as an alkali metal aluminate, may also be used. Specifically, it is preferred to use sodium hydroxide, calcium hydroxide, magnesium hydroxide, ammonia, triethylamine, tetramethylammonium hydroxide, sodium aluminate and potassium aluminate alone or in combination as a suitable mixture. Among them, an alkali metal hydroxide such as sodium hydroxide or potassium hydroxide, sodium aluminate, or potassium aluminate, is preferred.

The temperature for the aggregation treatment is preferably from 50 to 150° C. The higher the temperature, the shorter the time for adequate progress in crystal growth and aggregation of the alumina hydrate particles and the larger the pore size and pore volume become. However, if the temperature exceeds 150° C., the operation tends to be difficult. The temperature is more preferably from 70 to 110° C.

The time required for the aggregation treatment is preferably at least one hour, although it may vary depending upon other factors. If the time is less than one hour, the crystal growth and aggregation of the alumina hydrate particles will not adequately proceed, and the pore size and pore volume will not be adequately large.

In the aggregation treatment, as a solvent for the dispersion of an alumina hydrate, water is preferably used. In the solvent, an organic solvent compatible with water, such as ethanol or isopropanol, may be incorporated in an amount of at most 50 mol %.

The solid content of the dispersion of an alumina hydrate in the aggregation treatment is from 1 to 40 wt %. If the solid content is less than 1 wt %, the crystal growth and aggregation of the alumina hydrate particles will not proceed adequately, and the pore size and pore volume will not be adequately large. If it exceeds 40 wt %, the dispersion tends to be highly viscous, whereby stirring tends to be difficult. The solid content is more preferably from 3 to 20 wt %. Here, the solid content is a concentration obtained by calculation based on the solid obtained by drying the dispersion of an alumina hydrate at 140° C. to a constant weight. In the present invention, the starting material alumina hydrate may, for example, be a commercially available alumina hydrate powder, or an alumina hydrate obtainable by hydrolysis of an aluminum alkoxide or an inorganic salt of aluminum.

As the starting material aluminum alkoxide, aluminum isopropoxide is, for example, preferred, and it is hydrolyzed to obtain an alumina hydrate. As starting material inorganic salt of aluminum, an alkali metal aluminate is preferred, as the case requires, an alkali metal hydroxide may be added to an alkali metal aluminate. To the inorganic salt of aluminum, an acid or a salt of aluminum which gives acidic solution when dissolved, is mixed, followed by hydrolysis to obtain alumina hydrate. As a salt of aluminum which gives acidic solution when dissolved, aluminum chloride, aluminum sulfate, aluminum nitrate and polyaluminum chloride may, for example, be used. A polyaluminum chloride is a compound indicated by $Al_n(OH)_mCl_{3n-m}$ ($1<n<5$, $m<10$). It is preferred that a basicity, defined by JIS-K4175, of the polyaluminum chloride is from 5 to 95%.

Further, it is possible to employ an alumina hydrate obtainable by ion exchange of an alkali metal aluminate by a cation exchange resin, or by ion exchange of a salt of aluminum which gives acidic solution when dissolved, by anion exchange resin.

In the present invention, as the dispersion of an alumina hydrate, an alumina sol wherein a part is already peptized to a sol, may be employed, and a commercially available alumina sol may, for example, be used.

When an alumina hydrate having a large average particle size is used as the starting material, it is preferably pulverized by e.g. a medium-stirring mill before the aggregation treatment. If the material is pulverized by a medium-stirring mill to an average secondary particle size of at most 1 μm, preferably at most 0.7 μm, the crystal growth and aggregation of the alumina hydrate will take place more effectively, whereby it is possible to obtain an alumina sol which gives, when dried, an alumina hydrate powder having large pore size and pore volume and high transparency.

Here, as the material for beads, etc. of the medium-stirring mill, alumina or zirconia is preferred with a view to preventing abrasion or inclusion of impurities.

In the present invention, at the stage when the aggregation treatment has been completed, the alumina hydrate may be in a dispersion state and is not required to be an adequately peptized alumina sol. In the present invention, the dispersion after the aggregation treatment is optionally washed and dried, whereby an alumina hydrate powder having large pore size and pore volume can easily be obtained. However, this alumina hydrate powder has an average secondary particle size of at least 1 μm and does not contain a peptizer such as an acid. Accordingly, even if it is dispersed in a solvent, an adequately uniform dispersion can not be obtained, and the transparency is inadequate.

Therefore, in order to obtain an alumina sol or alumina hydrate powder which has good transparency as well as large pore size and pore volume, a peptizer such as an acid is added to the dispersion after the aggregation treatment to carry out peptization treatment.

In a case where the dispersion after the aggregation treatment contains a large amount of impurity ions such as alkali metal ions, it is preferred to remove such impurity ions for purification prior to the peptization treatment. As a method for removing the impurities, it is efficient and preferred to employ an ultrafiltration membrane.

In the present invention, it is preferred to carry out the purification to such an extent that the total amount of the impurity ions would be at most 10 milliequivalent per mol of aluminum atoms. Expediently, purification may be carried out until the electro-conductivity of the filtrate becomes preferably at most 100 μS/cm. If the amount of impurity ions exceeds 10 milliequivalent, the pore size and pore volume of the alumina hydrate obtainable by drying, tend to be small, and even by peptization treatment, an alumina sol having good dispersibility tends to be hardly obtained.

The acid to be added for the peptization treatment is not particularly limited, and an inorganic acid such as hydrochloric acid, nitric acid, sulfuric acid or amidosulfuric acid, or an organic acid such as acetic acid, may be used. It is particularly preferred to use acetic acid or amidosulfuric acid among them.

The amount of the acid for the peptization treatment is preferably from 0.005 to 0.2 equivalent per mol of aluminum atoms in the alumina sol. If the amount is less than 0.005 equivalent, not only it takes a long time for the peptization, but also gelation is likely to result when the concentration of the alumina sol is high, such being undesirable. If the amount exceeds 0.2 equivalent, it is likely that the alumina hydrate will dissolve, such being undesirable. It is more preferably from 0.01 to 0.1 equivalent.

In the present invention, the peptization treatment is preferably carried out at a temperature of at least 70° C., especially at least 80° C., with stirring for at least one hour. If the temperature is lower than 70° C., it may take a long time for the peptization, or the peptization tends to be inadequate, such being undesirable. Further, if the temperature is high, the vapor pressure of the solvent tends to be high and boiling is likely to take place, whereby the operation tends to be difficult. Accordingly, the temperature is preferably at most 120° C. The time required for the peptization tends to be shortened by increasing the content of the acid as a peptizer. However, it is usually preferably from 1 to 72 hours.

In the present invention, as a method for the peptization, instead of the above mentioned heat treatment, ultrasonic treatment of the dispersion of an alumina hydrate may also be used. It is particularly preferred to carry out the ultrasonic treatment after the heat treatment.

By the above peptization treatment, the secondary particle size of alumina sol particles can easily be adjusted. It is preferred to adjust the average secondary particle size to a level of from 50 to 1000 nm, whereby it is possible to obtain an alumina sol which gives, when dried, an alumina hydrate powder having large pore size and pore volume and high transparency. Further, the alumina hydrate powder obtainable by drying such an alumina sol, contains an acid as a peptizer, and when mixed with a binder, it will readily be re-peptized. Accordingly, also by using this alumina hydrate powder, it is possible to present a coating fluid which is capable of forming an ink-receiving layer having high transparency. Here, if the temperature for drying the alumina sol is too low, it takes a long time for drying. Accordingly, the drying temperature is preferably at least 50° C.

According to the process of the present invention, it is possible to easily produce an alumina hydrate powder having large pore size and pore volume, and an alumina sol which, when dried, presents an alumina hydrate powder having large pore size and pore volume and high transparency. And, when an ink-receiving layer is formed by coating and drying on a substrate a proper mixture of the alumina sol or alumina hydrate powder obtained by the process of the present invention and a binder, it is possible to obtain a recording medium excellent in ink absorptivity. Further, if a transparent substrate is employed, it is possible to obtain a transparent recording medium.

Referring specifically to the characteristics of the alumina sol obtainable by the present invention, the transmittance of a light having a wavelength of 530 nm through an alumina sol having the sol concentration adjusted to 0.5 wt %, is from 5 to 70%, and the alumina hydrate powder has an average pore radius of at least 5 nm and a total volume of pores having pore radii of from 1 to 100 nm of from 0.50 to 2.00 cc/g. Here, the alumina hydrate powder is a xerogel obtained by drying the alumina sol at 140° C. to a constant weight, and the sol concentration is a solid content obtained by calculation based on the above xerogel in the alumina sol.

The sol particles in the alumina sol and the alumina hydrate powder, according to the present invention, are preferably an alumina hydrate having a boehmite structure represented by a compositional formula $Al_2O_3 \cdot xH_2O$ ($0 \leq x < 2$). The crystals having such a boehmite structure in the alumina sol and the alumina hydrate powder of the present invention preferably have a thickness of each crystallite in a direction perpendicular to the (010) face (hereinafter referred to as the crystallite size) of at least 6.0 nm. If the crystal size is less than 6.0 nm, an ink-receiving layer excellent in absorptivity, can not be formed.

This crystallite size is a value obtained by a Shieler's formula ($t = 0.9 \lambda / B\cos\theta$) from the diffraction angle $2\theta$ (°) of the peak of the (020) face and the half value width B (rad) obtained from the X-ray diffraction analysis of the alumina hydrate powder obtained by drying the alumina sol at 140° C. to a constant weight. In this formula, t is the crystallite size (nm), and $\lambda$ is the wavelength (nm) of the X-ray.

The alumina sol or the alumina hydrate powder of the present invention contains an acid which serves as a peptizer. Accordingly, when it is mixed with a binder or the like to form a dispersion of an alumina hydrate, it can easily be formed into a sol. Further, by using such an alumina sol or an alumina hydrate powder, it is possible to form an ink-receiving layer having high transparency and excellent ink absorptivity. Namely, the alumina sol or the alumina hydrate powder of the present invention is preferred for a recording medium.

The binder for forming an ink-receiving layer may, for example, be an organic substance, such as starch or its modified product, a polyvinyl alcohol or its modified product, SBR latex, NBR latex, hydroxycellulose or polyvinylpyrrolidone. If the amount of the binder is too small, the strength of the porous ink-receiving layer tends to be inadequate, and if it is too much, the ink absorptivity tends to be poor. Accordingly, the amount of the binder is preferably from 3 to 50 wt %, based on the alumina hydrate particles.

The sol obtained by dispersing the alumina sol or the alumina hydrate powder of the present invention in water, has a light transmittance at 0.5 wt % of from 5 to 70% and thus is excellent in transparency. More preferably, the light transmittance at 0.5 wt % is at least 10%.

The average secondary particle size of the alumina sol of the present invention is preferably from 50 to 1000 nm, as measured by means of a laser scattering particle size measuring apparatus. If the average secondary particle size is less than 50 nm, although the transparency of the alumina sol may be high, the average pore radius and the pore volume of the alumina hydrate powder obtainable by drying the sol tend to be small, such being undesirable. If it exceeds 1000 nm, the transparency of the alumina sol tends to be low, such being undesirable. More preferably, it is at most 400 nm.

The method for adjusting the average secondary particle size of the alumina sol within a range of from 50 to 1000 nm, is not particularly limited. However, it is preferred to carry out heating and stirring and/or application of ultrasonic vibration, after adding an acid as a peptizer to the dispersion of an alumina hydrate.

With respect to the pore structure of the alumina hydrate powder of the present invention, the average pore radius is at least 7 nm, and the total volume of pores having pore radii of from 1 to 100 nm is from 0.80 to 2.00 cc/g. With such a pore structure, the ink-receiving layer formed by a coating fluid consisting essentially of the alumina sol or the alumina hydrate powder of the present invention, is excellent in ink absorptivity.

If the average pore radius is less than 7 nm, or if the total volume of pores is less than 0.80 cc/g, the ink absorptivity of the ink-receiving layer tends to be poor, such being undesirable. On the other hand, if the total volume of pores exceeds 2.00 cc/g, the ink-receiving layer tends to be very porous, whereby the mechanical strength tends to be so poor that it is not practically adequate. More preferably, the total volume of pores is from 0.9 to 1.6 cc/g.

The solid content of the alumina sol of the present invention is not particularly limited, but is preferably from 5 to 40 wt %. If the solid content exceeds 40 wt %, the alumina sol tends to be highly viscous and difficult to handle. On the other hand, if it is less than 5 wt %, a large amount of water has to be evaporated to form an ink-receiving layer by drying, such being disadvantageous from the viewpoint of the production. The solid content is more preferably from 10 to 30 wt %.

Now, the process of the present invention will be described in detail with reference to Examples of the present invention (Examples 1 to 8) and Comparative Examples (Examples 9 to 11). However, it should be understood that the present invention is by no means restricted by such specific Examples.

Evaluation of various properties was carried out by the following methods (1) to (4). The results of measurements are shown in Table 1. In the following Examples, the alumina hydrate powder is a xerogel obtained by drying an alumina sol at 140° C. to a constant weight, and the sol concentration is a solid content of an alumina sol calculated based on such a xerogel.

(1) Particle size (unit: nm): The average secondary particle size of sol particles of an alumina sol, was measured by a laser scattering particle size measuring apparatus LPA-3000/3100 Model, manufactured by Ootsuka Denshi K.K.

(2) Light transmittance (unit: %): An alumina sol was diluted to a sol concentration of 0.5 wt %, and the transmittance of a light having a wavelength of 530 nm was measured in a thickness of 10 mm by a spectral photometer UV-1200 Model, manufactured by Shimadzu Corporation.

(3) Crystallite size (unit: nm): With respect to an alumina hydrate powder, the crystallite size was obtained by the X-ray diffraction.

(4) Pore volume (unit: cc/g), pore radius (unit: nm), and specific surface area (unit: m$^2$/g): An alumina hydrate powder was vacuum-deaerated at 120° C. under $1 \times 10^{-2}$ Torr for two hours, and then measurements were carried out by means of a nitrogen absorption-desorption apparatus Omnisorp 100 Model, manufactured by Coalter Company. In the Examples and Comparative Examples, the pore volume means the total volume of pores having pore radii of from 1 to 100 nm, and the pore radius means an average pore radius.

EXAMPLE 1

Into a glass reactor having a capacity of 2000 cc, 140 cc of an aqueous aluminum nitrate solution having a concentration of 5 wt % as calculated as $Al_2O_3$ and 1500 cc of deionized water were charged and heated to 95° C. While maintaining this solution at 95° C., an aqueous sodium aluminate solution having a concentration of 20 wt % as calculated as $Al_2O_3$ was added thereto with stirring until the pH of the solution became 9.5. After maintaining the solution for 5 minutes at pH 9.5, an aqueous aluminum nitrate solution having a concentration of 5 wt % was added thereto until the pH of the solution became 3.5. After maintaining the solution for 5 minutes at pH 3.5, an aqueous sodium aluminate solution having a concentration of 20 wt % was again added thereto until the pH of the solution became 9.5, and the solution was maintained for 5 minutes at pH 9.5. In the same manner, the change of pH between 3.5 and 9.5 was repeated eight times, and then the solution was cooled to room temperature to obtain a liquid wherein fine particles of alumina were suspended.

Using an ultrafiltration apparatus, this liquid was subjected to ultrafiltration while maintaining the volume of the solution to be constant by adding deionized water, until the electro-conductivity of the filtrate decreased to a level of not higher than 10 $\mu$S/cm. Then, an aqueous sodium hydroxide solution was added thereto until the pH of the solution became 10.0, and the solution was heated again to 95° C. and maintained from 95 to 97° C. with intensive stirring for 48 hours for aggregation treatment. As the reactor, a reactor having a capacity of 2000 cc and provided with four baffle plates, was used, and stirring was carried out at 600 rpm by using anchor vanes as the stirring vanes. The effective consumptive power for stirring at that time was 1.5 kW/m$^3$.

Thereafter, acetic acid was added to the obtained dispersion in an amount of 0.025 equivalent per mol of aluminum atoms, and the dispersion was maintained at a temperature of from 95 to 97° C. for 24 hours for peptization. Then, it was concentrated until the sol concentration became 10 wt % and then subjected to ultrasonic treatment to obtain an alumina sol.

EXAMPLE 2

An alumina sol was prepared in the same manner as in Example 1 except that after the ultrafiltration, aggregation treatment was carried out for 34 hours by changing the rotational speed for stirring to 700 rpm, and changing the actual consumptive power for stirring to 2.0 kW/m$^3$.

EXAMPLE 9

An alumina sol was prepared in the same manner as in Example 1 except that after the ultrafiltration, no aggregation treatment was carried out, and after raising the temperature, acetic acid was immediately added for peptization.

EXAMPLE 3

Into a glass reactor having a capacity of 3.0 m$^3$, 451 kg of an aqueous aluminum chloride solution having a concentration of 11.5 wt % as calculated as $Al_2O_3$ and 2053 kg of deionized water were charged, and 339 kg of an aqueous sodium aluminate solution having a concentration of 20.0 wt % as calculated as $Al_2O_3$, was added with stirring to adjust the pH to 5.0, thereby to obtain a dispersion of an alumina hydrate. A 48 wt % sodium hydroxide aqueous solution was added to this dispersion to bring the pH of the dispersion to 11.0. The dispersion is heated to 95° C., and aggregation treatment was carried out for 27 hours while maintaining the dispersion at 95° C. with intensive stirring. At that time, Faudler vanes were used as the stirring vanes, and the effective consumptive power for stirring was 0.7 kW/m$^3$.

Using an ultrafiltration apparatus, the dispersion after the aggregation treatment was subjected to ultrafiltration while maintaining the volume of the solution to be constant by adding deionized water, until the electro-conductivity of the filtrate decreased to a level of not higher than 15 $\mu$S/cm. Acetic acid was added to this dispersion in an amount of 0.05 equivalent per mol of aluminum atoms, and the dispersion was maintained from 95 to 97° C. for 24 hours for peptization. Then, it was concentrated until the sol concentration became 10 wt % and then subjected to ultrasonic treatment to obtain an alumina sol.

EXAMPLE 4

1930 g of a dispersion of an alumina hydrate having a pH of 5.0, obtained in the same manner as in Example 3, was put into a glass reactor having a capacity of 2000 cc and provided with four baffle plates, and a 48 wt % sodium hydroxide aqueous solution was added thereto to bring the pH of the dispersion to 11.0. The dispersion was heated to 95° C., and aggregation treatment was carried out for 20 hours while maintaining the dispersion at 95° C. with intensive stirring. Anchor vanes were used as the stirring vanes, and stirring was carried out at 600 rpm. The effective consumptive power for stirring was 1.5 kW/m$^3$. Then, purification and peptization were carried out in the same manner as in Example 3 to obtain an alumina sol.

EXAMPLE 5

An alumina sol was prepared in the same manner as in Example 4 except that the time for the aggregation treatment was changed to 96 hours.

EXAMPLE 6

A dispersion of an alumina hydrate having a pH of 5.0 was prepared in the same manner as in Example 3 except that a glass reactor having a capacity of 3.0 m$^3$ and provided with four baffle vanes, was used. A 48 wt % sodium hydroxide aqueous solution was added to this dispersion to bring the pH of the dispersion to 11.0. The dispersion was heated to 95° C., and aggregation treatment was carried out for 11 hours while maintaining the dispersion at 95° C. with intensive stirring. At that time, five-stage paddle vanes were used as the stirring vanes, and stirring was carried out at 84 rpm. The effective consumptive power for stirring at that time was 3.6 kW/m$^3$. Then, purification and peptization were carried out in the same manner as in Example 3, to obtain an alumina sol.

EXAMPLE 10

An alumina sol was prepared in the same manner as in Example 3 except that a dispersion of an alumina hydrate having a pH of 5.0, obtained in the same manner as in Example 3, was not subjected to aggregation treatment.

EXAMPLE 7

A dispersion having 600 cc of deionized water added to 75 g of commercially available boehmite (average secondary particle size: 60 $\mu$m), was pulverized by a medium-stirring mill using zirconia beads having a diameter of 0.3 mm to an average secondary particle size of 285 nm. Then, this dispersion was put into a glass reactor having a capacity of 2000 cc and provided with four baffle plates, and 825 cc of deionized water was added thereto. Further, an aqueous solution of sodium hydroxide in an amount of 1 milliequivalent per mol of aluminum atoms, was added thereto to bring the pH to 9.4. The dispersion was heated to 90° C., and aggregation treatment was carried out for 9 hours. At that time, anchor vanes were used as the stirring vanes, and stirring was carried out at 570 rpm. The effective consumptive power for stirring was 1.7 kW/m$^3$.

Without purifying this dispersion, acetic acid was added thereto in an amount of 0.025 equivalent per mol of aluminum atoms, and the dispersion was maintained at 90° C. for 14 hours for peptization. Then, it was concentrated until the sol concentration became 10 wt %, and then subjected to ultrasonic treatment to obtain an alumina sol.

EXAMPLE 11

Without pulverizing the commercially available boehmite particles as used in Example 7, deionized water was added thereto so that the alumina concentration became 10 wt %, to obtain a dispersion. Acetic acid was added thereto in an amount of 0.2 equivalent per mol of aluminum atoms, and the dispersion was maintained at 95° C. for 72 hours. Further, it was subjected to supersonic treatment, but it was not possible to bring the secondary particle size to a level of not more than 1 $\mu$m.

EXAMPLE 8

After carrying out the aggregation treatment and purification in the same manner as in Example 4, no peptization treatment was carried out, and the light transmittance was measured. Then, the dispersion was dried at 140° C. to obtain an alumina hydrate powder.

From the comparison between Examples 1 to 6 and Examples 9 and 10, it is evident that by the aggregation treatment, the crystal growth and aggregation of alumina hydrate particles adequately proceed, whereby the pore volume and pore radius become large.

From the comparison between Example 1 and Example 2 and among Examples 3, 4 and 6, it is evident that if the effective consumptive power for stirring during the aggregation treatment is large, the crystal growth and aggregation of the alumina hydrate particles adequately proceed in a short period of time. Further, from the comparison between Example 4 and Example 5, it is evident that the longer the time for the aggregation treatment, the larger the pore volume and pore radius of the alumina hydrate powder.

From Examples 7 and 11, it is evident that even when boehmite particles having small pore volume and pore radius, which are hardly peptized, are used as the starting material, it is possible to obtain an alumina sol which provides an alumina hydrate powder having larger pore volume and pore radius and high transparency, if the starting material is pulverized by e.g. a medium-stirring mill and subjected to aggregation treatment.

Further, from the comparison of Example 8 and Example 4, it is evident that an alumina hydrate powder obtained by drying without peptization treatment, has very large pore volume and pore radius, although the transparency is low.

EXAMPLE 12

Into a glass reactor having a capacity of 3.0 m$^3$, 491 kg of basic polyaluminum chloride having a concentration of 24 wt % as calculated as $Al_2O_3$ and a basicity of 84% (Tradename: TAKI BINE #1500, manufactured by TAKI CHEMICAL Co., LTD.), and 2320 kg of deionized water were charged and heated to 95° C. While maintaining this solution at 95° C., an aqueous sodium aluminate solution having a concentration of 20 wt % as calculated as $Al_2O_3$ was added, thereby to obtain an aluminum hydrate dispersion having a pH of 8.7 at 95° C.

Then, aggregation treatment was carried out for 18 hours while maintaining the dispersion at 93 to 97° C. with intensive stirring. At that time, five-stage paddle vanes were used as the stirring vanes, and stirring was carried out at 90 rpm. The effective consumptive power for stirring at that time was 4.2 kW/m$^3$. Then, purification and peptization were carried out in the same manner as in Example 3, to obtain an alumina sol.

TABLE 1

| | Particle size | Light transmittance | Crystallite size | Pore volume | Pore radius | Specific surface area |
|---|---|---|---|---|---|---|
| Example 1 | 195 | 16.5 | 9.5 | 1.05 | 10.5 | 187 |
| Example 2 | 200 | 15.8 | 9.7 | 1.12 | 11.0 | 180 |
| Example 3 | 142 | 43.8 | 7.8 | 0.82 | 7.2 | 194 |
| Example 4 | 145 | 40.5 | 8.5 | 0.85 | 7.9 | 191 |
| Example 5 | 163 | 21.3 | 12.0 | 0.91 | 11.1 | 142 |
| Example 6 | 143 | 41.7 | 8.7 | 0.83 | 7.5 | 192 |
| Example 7 | 149 | 45.7 | 7.8 | 0.87 | 8.4 | 177 |
| Example 8 | — | 0.1 | 8.5 | 1.15 | 11.5 | 185 |
| Example 9 | 190 | — | 5.0 | 0.37 | 4.1 | 240 |
| Example 10 | 151 | — | 2.5 | 0.20 | 2.3 | 288 |
| Example 11 | — | — | 3.7 | 0.45 | 3.9 | 162 |
| Example 12 | 195 | 15.5 | 9.8 | 1.04 | 9.5 | 175 |

By the process of the present invention, it is possible to easily produce an alumina hydrate powder having large pore size and pore volume, and an alumina sol which provides, upon removal of the solvent therefrom, an alumina hydrate having large pore size and pore volume and high transparency. When the alumina hydrate powder is suitably mixed with a binder to obtain a coating fluid, and the coating fluid is coated and dried on a substrate to form an ink-receiving layer, a recording medium having good ink absorptivity can be obtained.

Further, the alumina sol or the alumina hydrate powder obtained by removing the solvent from the alumina sol, is suitably mixed with a binder to obtain a coating fluid, and the coating fluid is coated and dried on a substrate to form an ink-receiving layer, whereby a recording medium having good ink absorptivity and having an ink-receiving layer excellent in transparency, can be obtained. Especially when an ink-receiving layer is formed on a transparent substrate, a recording medium suitable for use as an OHP sheet can be obtained. Further, when an ink-receiving layer is formed on an opaque substrate, it is possible to obtain a clear record having a high color density.

What is claimed is:

1. A process for producing an alumina sol, which comprises stirring a dispersion of an alumina hydrate having a solid content of from 1 to 40 wt % at a pH of from 7 to 12 with an effective consumptive power of at least 0.5 kW/m$^3$ for aggregation treatment, and then adding an acid thereto for peptization treatment.

2. The process for producing an alumina sol according to claim 1, wherein, in the aggregation treatment, the pH is adjusted to from 7 to 12 by adding an alkali metal hydroxide or an alkali metal aluminate to the dispersion of an alumina hydrate.

3. The process for producing an alumina sol according to claim 1, wherein the alumina hydrate is an alumina hydrate obtained by hydrolysis of an inorganic salt of aluminum or an aluminum alkoxide.

4. The process for producing an alumina sol according to claim 1, wherein the alumina hydrate has an average secondary particle size of at most 1 μm.

5. The process for producing an alumina sol according to claim 1, wherein the acid which is added for the peptization treatment, is hydrochloric acid, nitric acid, acetic acid or amidosulfuric acid.

6. The process for producing an alumina sol according to claim 1, wherein the acid which is added for the peptization treatment, is in an amount of from 0.005 to 0.2 equivalent per mol of aluminum atoms in the alumina hydrate.

7. The process for producing an alumina sol according to claim 1, wherein, prior to the peptization treatment, impurity ions contained in the dispersion of an alumina hydrate are removed to a level of at most 10 milliequivalent per mol of aluminum atoms.

8. A process for producing an alumina hydrate powder, which comprises stirring a dispersion of an alumina hydrate having a solid content of from 1 to 40 wt % at a pH of from 7 to 12 with an effective consumptive power of at least 0.5 kW/m$^3$ for aggregation treatment, followed by drying.

9. The process for producing an alumina hydrate powder according to claim 8, wherein, after the aggregation treatment, an acidic peptizer is added to the dispersion to obtain an alumina sol, and the alumina sol is then dried to obtain the alumina hydrate powder.

10. The process for producing an alumina hydrate powder according to claim 8, wherein, in the aggregation treatment, the pH is adjusted to from 7 to 12 by adding an alkali metal hydroxide or an alkali metal aluminate to the dispersion of an alumina hydrate.

11. The process for producing an alumina hydrate powder according to claim 8, wherein the alumina hydrate is an alumina hydrate obtained by hydrolysis of an inorganic salt compound of aluminum or an aluminum alkoxide.

* * * * *